(12) United States Patent
Rauhala et al.

(10) Patent No.: US 11,415,659 B2
(45) Date of Patent: Aug. 16, 2022

(54) PRIVACY SENSITIVE POSITIONING

(71) Applicant: HERE GLOBAL B.V., Eindhoven (NL)

(72) Inventors: Petri Rauhala, Tampere (FI); Ari Ilkka Antero Hännikäinen, Ruutana (FI); Matias Mikkola, Tampere (FI); Juha Kaitaniemi, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 340 days.

(21) Appl. No.: 16/706,090

(22) Filed: Dec. 6, 2019

(65) Prior Publication Data

US 2020/0182960 A1    Jun. 11, 2020

(30) Foreign Application Priority Data

Dec. 7, 2018   (EP) .................................... 18211024

(51) Int. Cl.
*G01S 5/02*    (2010.01)

(52) U.S. Cl.
CPC .......... *G01S 5/0252* (2013.01); *G01S 5/0278* (2013.01)

(58) Field of Classification Search
CPC .............................. G01S 5/0252; G01S 5/0278
USPC ........................................................ 342/451
See application file for complete search history.

(56) References Cited

U.S. PATENT DOCUMENTS

| 9,432,803 | B1 * | 8/2016 | Gordon ................... G06F 16/29 |
| 2014/0331329 | A1 | 11/2014 | Edge et al. |
| 2015/0350891 | A1 | 12/2015 | Arunkumar et al. |
| 2017/0086024 | A1 | 3/2017 | Do |
| 2018/0302751 | A1 * | 10/2018 | Coutinho .............. G01S 5/0036 |
| 2018/0351661 | A1 | 12/2018 | Briggs et al. |

FOREIGN PATENT DOCUMENTS

| EP | 2 650 845 A2 | 10/2013 |
| GB | 2 420 471 A | 5/2006 |
| GB | 2 526 614 A | 12/2015 |
| WO | WO-2015198090 A1 * | 12/2015 ........... G01S 5/0252 |

OTHER PUBLICATIONS

Extended European Search Report for Application No. EP 18 21 1024 dated Mar. 13, 2019.

(Continued)

*Primary Examiner* — Harry K Liu
(74) *Attorney, Agent, or Firm* — Alston & Bird LLP (57) ABSTRACT

A method is disclosed that includes obtaining a request for determining a position estimate of a certain position. With the request, the certain position of a single apparatus is requested. The method also includes obtaining or determining a deviate information indicative of an offset that is added to the position estimate to be determined. The method further includes determining the position estimate based at least partially on the deviate information and the fingerprint information. The position estimate is indicative of a position with an uncertainty radius. It is further disclosed an according apparatus, computer readable storage medium and system.

20 Claims, 3 Drawing Sheets

(56) References Cited

OTHER PUBLICATIONS

Developer Guide | Geolocation API | Google Developers [online] [retrieved Apr. 3, 2020]. Retrieved via the Internet: https://web.archive.org/web/20181105180358/https://developers.google.com/maps/documentation/geolocation/intro (Nov. 5, 2018) 9 pages.

Wi-Fi Positioning System—Wikipedia [online] [retrieved Apr. 3, 2020]. Retrieved via the Internet: https://web.archive.org/web/20181119003535/https://en.wikipedia.org/wiki/Wi-Fi positioning system (dated Nov. 19, 2018) 6 pages.

Guide—Positioning API—HERE Developer; Requesting a Position [online] [retrieved Feb. 21, 2020]. Retrieved via the Internet: https://developer.here.com/documentation/positioning/dev_guide/topics/request-first-locat . . . HERE (copyright 2020) (undated) 3 pages.

Guide—Positioning AP—HERE Developer; Finding a Position [online] [retrieved Feb. 21, 2020]. Retrieved via the Internet: https://developer.here.com/documentation/positioning/dev_guide/topics/finding-positions . . . HERE (copyright 2020) (undated) 2 pages.

* cited by examiner

PRIVACY SENSITIVE POSITIONING

CROSS-REFERENCE TO RELATED APPLICATIONS

This application claims priority to European Application No. 18211024.7, filed Dec. 7, 2018, the entire contents of which are incorporated herein by reference.

FIELD

The following disclosure relates to the field of positioning, or more particularly relates to systems, apparatuses, and methods for enabling position estimates to be determined based on requests for determining such position estimates of single apparatuses only.

BACKGROUND

Satellite signal based positioning technologies, which are mainly used outdoors, are usually not suited to deliver a satisfactory performance when used for indoor positioning, since satellite signals of GNSS (Global Navigation Satellite System), like the GPS (Global Positioning System) or the Galileo system, do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated non-GNSS based (e.g. radio) positioning systems for indoor and outdoor positioning have been developed and commercially deployed during the past years. Examples comprise systems that are based on pseudolites, which are ground based GPS-like short-range beacons, ultra-sound positioning systems, BLE (Bluetooth Low Energy) based positioning systems, cellular network based positioning systems and WLAN (Wireless Local Area Network) based positioning systems.

One possibility is that positioning data is collected e.g. during a training stage of the positioning system. The data can then be used in the following to enable positioning. The data may be collected, e.g. by a plurality of mobile devices, in the form of radio fingerprint observation reports that are based on measurements of the mobile devices. A radio fingerprint observation report may indicate an observation position and radio signal parameters obtained as a result of measurements taken from the radio interface when scanning for observable radio signals at the observation position. The observation position may be for example GNSS-based, sensor-based, or manually inputted. Measurements taken from the radio interface may comprise, by way of example, measured received signal strengths and identifiers of radio devices (e.g. Bluetooth beacons, WLAN access points, base stations of a cellular network) transmitting the radio signals observable at the observation position. The training may be a continuous background process, in which electronic devices (e.g. mobile devices) of a large number of consumers are continuously reporting collected fingerprint observation reports to a server. Consumers may consent to a participation in such a radio fingerprint observation report collection, if their device is equipped with the needed functionality. This approach is also referred to as crowd-sourcing. Since crowd-sourcing is a background process that does not directly benefit the device user, it is desirable that the crowd-sourcing process only consumes limited resources of the device.

Alternatively or additionally, electronic devices (e.g. mobile devices) may be used for collecting radio fingerprint observation reports in a systematic manner. Collected reports may be uploaded to a database e.g. in a positioning server or in a positioning cloud, where algorithms may be run to generate radio models of positioning support devices (e.g. Bluetooth beacons, WLAN access points, base stations of a cellular network) and/or radio maps for positioning purposes.

In a positioning stage, a mobile device may estimate its current position based on own measurements taken from the radio interface and on information or a subset of information that is available from the training stage. Radio model information or radio map information that has been generated in the training stage may be provided to mobile devices by a positioning server via the Internet as assistance information for use in position estimation. Alternatively, radio model information and/or radio map information may be stored in a positioning server to which the mobile devices may connect to via the Internet for obtaining a position estimate.

Such a positioning server may further provide positioning services which returns estimated coordinates based on input e.g. access point IDs (i.e. WLAN MAC (Medium Access Control) addresses, to name but one non-limiting example). Since identifiers of access points may be comprised by the radio fingerprint observation reports, a location of a respective access point may be determinable. Of course, signal strengths could be input optionally as well. For instance, because some WLAN enabled devices can be associated to a person, and the estimated location of them is quite accurate (e.g. up to an accuracy of 1-2 meters), such WLAN based positioning raises some privacy concerns. A positioning service could be potentially misused for finding a location of a person, given that a related identifier (e.g. WLAN MAC address) e.g. of the respective WLAN access point whose position is requested to be determined is known. Since often times, a position of a certain access point is closely related with the actual position of its owner, privacy is an issue.

Therefore, in the prior art it is known to restrict that a position cannot be requested for a single (e.g. WLAN) access point, but two or more co-located access points must be included in the request to determine the position. The issues apply to other radio-enabled devices, e.g. Bluetooth- and/or BLE beacons, to name but a few non-limiting examples.

SUMMARY OF SOME EXEMPLARY EMBODIMENTS

However, since positioning is restricted for the above mentioned use cases, it would be advantageous to enable such a positioning thereby improving positioning availability since position estimates can be determined at more circumstances.

It is thus, inter alia, an object of the invention to enable the determining of a position estimate for an electronic device based on signals of a single apparatus (e.g. WLAN access point, BT-, or BLE beacon) while solving the mentioned privacy issues.

According to a first exemplary aspect of the present invention, a method is disclosed, the method comprising:
 obtaining a request for determining a position estimate of a certain position, wherein with the request, the certain position of a single apparatuses requested;

obtaining or determining a deviate information indicative of an offset that is added to the position estimate to be determined; and determining the position estimate based at least partially on the deviate information and the fingerprint information, wherein the position estimate is indicative of a position with an uncertainty radius.

This method may for instance be performed and/or controlled by an apparatus, for instance a server. Alternatively, this method may be performed and/or controlled by more than one apparatus, for instance a server cloud comprising at least two servers. For instance, the method may be performed and/or controlled by using at least one processor of the server.

A single apparatus, as used herewith, is understood as a radio-enabled apparatus. Such a single apparatus may for instance be stationary. Such a single apparatus may for instance be a radio node (e.g. WiFi respectively WLAN access point, a Bluetooth beacon, a BLE beacon, to name but a few non-limiting examples). Such a single apparatus that is stationary within the meaning of the present invention may for instance be an electronic device, e.g. an IoT (Internet-of-Things) device, a smart home device, a tablet computer, a desktop computer, to name but a few non-limiting examples. Thus, such a single apparatus that is stationary may for instance be an electronic device that may for instance be used most of the time at the same location (e.g. mainly used at home), or only in a limited number of locations. Since such a single apparatus that is stationary, as used herein, is used quite often at the same or a limited number of locations, privacy issues may also concern such single apparatuses, since the location of such single apparatuses may for instance be comprised by crowd-sourced radio maps and thus be requestable, e.g. with a request as utilized by the method according to the first exemplary aspect of the present invention. A respective identifier (e.g. a MAC (Medium Access Control) address) of such a single apparatus may be known to a third party, which can use this identifier of the single apparatus to request the position of the single apparatus to be determined. The single apparatus may for instance be a radio-enabled device, thus comprising one or more radio interfaces (e.g. according to WLAN, BT (Bluetooth), BLE, or the like communication standard) and whose position can be determined.

Within the meaning of the present invention, it is differentiated between the term "apparatus", e.g. performing and/or controlling the method according to the first exemplary aspect of the present invention, and the term "single apparatus", wherein the latter—thus "single apparatus"—is related to the "entity" whose position is requested to be determined.

The apparatus performing and/or controlling this method may for instance be a module for device server or a server cloud. In this case, the apparatus may for instance enable the determining of one or more positions of other (radio-enabled) single apparatus (e.g. radio nodes, mobile devices, or a combination thereof), wherein each position of the one or more positions may be requested with a request for determining the position of such a single apparatuses, only.

The apparatus performing and/or controlling this method may for instance be a module for a server or a server cloud. This is assumed to be the most common use case since a server obtains (e.g. receives) a request for determining a position estimate of a certain single apparatuses. Since this single apparatus may for instance be closely related to a person (e.g. a radio node that is deployed in the home of the person, or a mobile device, e.g. a tablet, that is stationary within the meaning of the present invention,), there may for instance be some privacy issues respectively concerns since in case the position of the single apparatus is known, the position of the person owning the single apparatus can be assumed to be known with a very high likelihood. The prior art forbids such requests for determining a position estimate of a single apparatus in case the position of the single apparatus is requested. Example embodiments of the method according to the first exemplary aspect of the present invention however enable the determining since due to the adding of the offset, privacy issues respectively concerns are solved. In particular the privacy issues respectively concerns are solved, since the "true" position of the single apparatus is not provided as a response to the request, but a position estimate with an uncertainty is provided, since the offset of the deviate information is added to the determined position of the single apparatus.

According to a further exemplary aspect of the invention, a computer program is disclosed, the computer program when executed by a processor causing an apparatus, for instance a server, to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a further exemplary aspect of the invention, a system is disclosed, comprising:

at least one apparatus according to any aspect of the invention as disclosed above, and another entity (e.g. a server, or a computer), wherein the other entity is configured to send at least one request for determining a position of a single apparatus, and receives (e.g. as a response) a determined position estimate indicative of the certain position of the single apparatus.

According to a further exemplary aspect of the invention, a positioning system is disclosed which comprises at least one of the disclosed apparatus(es) and another entity. Optionally, the system may further comprise one or more radio nodes transmitting (e.g. broadcasting) one or more radio signals.

In the following, exemplary features and exemplary embodiments of all aspects of the present invention will be described in further detail.

The request may for instance be obtained by receiving the request. The request may for instance be obtained (e.g. received) from an electronic device (e.g. a personal computer) or from a server or a server cloud that is different from the apparatus performing and/or controlling the method according to the first exemplary aspect of the present invention.

Further, based on the obtained request, and further optionally based on the obtained fingerprint information, the certain position of the single apparatus may for instance be determined by obtaining (e.g. receiving) the request, and optionally the fingerprint information.

Further, e.g. a positioning server may for instance be utilized as follows: Such a positioning server may for instance comprise or be connectable to a database storing a global radio map, and/or one or more partial radio maps. Such a radio map may for instance be generated based on one or more pieces of fingerprint information (e.g. radio fingerprint observation report) so that such a radio map may for instance be utilized to determine a position estimate for the single apparatus, since the position of the single apparatus may for instance be comprised or represented by such a radio map. single apparatus Therefore, the certain position of the single apparatus may for instance be determined by requesting it from such a positioning server, which transmits (e.g. sends) upon reception of such a request e.g. a radio map, or the certain position, to the apparatus performing and/or controlling the method according to the first exemplary aspect of the present invention.

The obtained request may for instance comprise or be accompanied by a fingerprint information indicative of one or more signals sent by one or more radio nodes. The position estimate may for instance be determined based on such a fingerprint information. Based on the fingerprint information, e.g. a radio map may for instance be utilized to determine the position at which the respective fingerprint information was gathered (e.g. measured).

The fingerprint information may for instance be gathered prior to the obtaining of the request comprising or being accompanied by the fingerprint information.

The request may for instance comprise or represent an identifier of the single apparatus whose position is requested to be determined. Since it cannot be guaranteed that the request stems e.g. from the owner of the single apparatus, in order to fulfill privacy requirements, such as that a position of the single apparatus is not (e.g. steadily) trackable, example embodiment of the present invention do not block such a request requesting the position to be determined of this single apparatus, only, but uses the deviate information to be able to provide a position estimate of the apparatus, wherein the position estimate is associated with an uncertainty. This ensures that the "true" position is not provided.

The request may for instance be received via a communication interface of the apparatus performing and/or controlling the method according to the first exemplary aspect of the present invention. In case the position estimate to be determined of the single apparatus is not accurately determined, the position is represented by a position estimate that is deviated. Such a position estimate may for instance be in the form of coordinates, e.g. x-, y-coordinates, and/or latitude-, longitude-coordinates. Optionally, such a position estimate may for instance comprise or represent a three-dimensional position, e.g. in the form of three-dimensional coordinates (e.g. x-, y-, z-coordinates, and/or latitude-, longitude-, altitude-coordinates).

The deviate information is indicative of an offset that is added to the position estimate. The deviate information may for instance be determined at least partially based on the request, e.g. an identifier of the single apparatus that is comprised by or represented by the request. The offset enables that the position estimate to be determined, e.g. that is output (e.g. returned) to the sender of the obtained request, does not comprise or represent the 'true' coordinates, but those true coordinates added with the offset.

For instance, the single apparatus may for instance be a WiFi access point. This WiFi access point may for instance sent one or more (e.g. radio) signals that were observed by near-by mobile devices (e.g. smartphones performing crowd-sourcing of WiFi access points, or beacon devices, to name but a few non-limiting examples). If it is now requested that a position estimate of the WiFi access point is determined—thus only the position of this single apparatus is requested with the request—e.g. because of privacy restrictions, a deviate information is determined and utilized to enable the position estimate to be determined even in this aforementioned case.

According to an exemplary embodiment of all exemplary aspects of the present invention, the single apparatus is a radio node, in particular a stationary radio node. A stationary radio node within the meaning of the present invention is understood as a radio node that is deployed at a fixed location. The radio node may for instance be a WiFi respectively WLAN access point, a Bluetooth beacon, a BLE beacon, or a combination thereof, to name but a few non-limiting examples.

According to an exemplary embodiment of all exemplary aspects of the present invention, the request comprises or is accompanied by a fingerprint information indicative of one or more signals sent by the single apparatus, wherein the position estimate is determined further based on the fingerprint information.

According to an exemplary embodiment of all exemplary aspects of the present invention, the uncertainty radius indicates that the position of the position estimate is not exact.

In this way, an uncertainty radius of the determined position estimate is increased. Such an uncertainty may for instance be indicative of that the position as comprised by or represented by the determined position estimate is not exact.

The determined deviate information may for instance be stored, e.g. in a memory. Such a memory may for instance comprise a database. The memory may for instance be comprised by or connectable to the apparatus performing and/or controlling the method according to the first exemplary aspect of the present invention. Then, the determined deviate information may for instance be used in the future.

Further, the deviate information stored in the memory may for instance be associated with (e.g. linked to) a respective single apparatus, e.g. via an identifier of the respective single apparatus.

In case e.g. the memory comprises a deviate information for the single apparatus whose position is requested to be determined, there is no need to determine the deviate information, but the deviate information can be obtained e.g. from the memory. In case e.g. the memory does not comprise a deviate information for the respective single apparatus, the deviate information is determined, e.g. as described in this specification.

The deviate information and/or the position estimate may for instance be determined by a processor of the apparatus performing and/or controlling the method according to the first exemplary aspect of the present invention.

Determining (e.g. estimating) of the position of the respective single apparatus may for instance be performed and/or controlled at least partially based on (a) radio signal parameter(s), which may be understood to mean that the determining is performed as a function of the radio signal parameter(s), e.g. comprised by or represented by the fingerprint information. It is however to be understood that the estimating may optionally depend on further information like a radio map. For example, such a radio map may be configured to enable electronic devices (e.g. mobile devices) to estimate their position at least partially based on this radio map when the electronic devices are located in the area covered by the radio map. For example, the radio map is represented by radio map information which may be provided (e.g. transmitted) by a positioning server to an electronic device and/or which may be held available by an electronic device (e.g. stored in memory means of the electronic device(s)). For example, the radio map contains or represents a respective radio model for a plurality of radio nodes transmitting (e.g. broadcasting) radio signals that are observable within the area covered by the radio map. If the radio map covers a building, the radio map may contain or represent, for each floor of the building, a respective radio model for a plurality of radio nodes transmitting (e.g. broadcasting) radio signals that are observable on the respective floor of the building.

A respective radio model for a respective radio node of the plurality of radio nodes may be understood to represent at least the expected radio coverage of the respective radio node (e.g. on a certain floor of a building). For example, the radio model of such a radio node may describe the coverage area (e.g. on a certain floor of a building) within which radio signals transmitted or triggered to be transmitted by this radio node are expected to be observable. An example for such a radio model is a radio image representing an expected radio signal strength field of the radio signals transmitted or triggered to be transmitted by this radio node. The real radio coverage of such a radio positioning support device may however deviate from the expected radio coverage as described by such a radio model. As disclosed above, the radio map may be determined by the positioning server during the training stage of such a non-GNSS based radio positioning system. Causing of estimating (e.g. determining) of a position of an electronic device at least partially based on the radio signal parameter(s) may be understood to mean that the radio signal parameter(s) are provided (e.g. transmitted) by an electronic device e.g. to a positioning server to cause the positioning server to estimate (e.g. determine) a position of the electronic device at least partially based on the radio signal parameter(s).

The one or more radio signals may be terrestrial radio signals. Examples of such a terrestrial radio signal are a Bluetooth signal, a BLE signal, a cellular network signal or a WLAN signal. The Bluetooth standards are specified by the Bluetooth Special Interest Group and are presently available under https://www.bluetooth.com/. A cellular network may for example be mobile phone network like a 2G/3G/4G/5G cellular communication network. The 2G/3G/4G/5G cellular radio communication standards are developed by the 3GPP and presently available under http://www.3gpp.org/. WLAN is for example specified by the standards of the IEEE 802.11 family (http://www.ieee.org/).

A radio signal parameter of a certain radio signal may for example be obtained by the electronic device as a scanning result when scanning for observable radio signals at a certain position (e.g. for estimating its position). Therein, a radio signal may be understood to be observable at a certain position if the radio signal is receivable with a minimum quality (e.g. a minimum signal-to-noise ratio and/or a minimum signal power, e.g. at least −90 dbm or −95 dbm) at this position. For example, an electronic device may determine at least one respective radio signal parameter for each radio signal observed when scanning for radio signals at a certain position. The determined radio signal parameters may then for example be obtained as scanning results.

A radio signal parameter of a certain radio signal may be understood to be at least one of (1) an information (e.g. an identifier) contained in the radio signal and (2) a representation (e.g. an indicator or a value) of a physical quantity (e.g. a received signal strengths) of the radio signal. Accordingly, a radio signal parameter may be determined by at least one of (1) extracting information contained in the radio signal and (2) measuring a physical quantity (e.g. a received signal strength) of the radio signal.

Optionally, the determined position estimate is output, e.g. to the entity from which the obtained request stems, or to another entity that is different from the entity from which the obtained request stems, and which transmits (e.g. relays) the output position estimate to the entity from which the obtained request stems. The position estimate may for instance be output via the communication interface of the apparatus performing and/or controlling the method according to the first exemplary aspect of the present invention. Such a communication interface may for instance comprise one or more radio transceivers (e.g. transmitter and receiver), e.g. according to WLAN-, BT-, BLE-, cellular-communication standard, or a combination thereof, to name but a few non-limiting examples.

According to an exemplary embodiment of all exemplary aspects of the present invention, the offset of the deviate information is a random-like offset that is applied to the position when it is determined.

The random-like offset enables to prevent exploitation of the 'true' position of the single apparatus. The random-like offset may for instance hinder third parties to predict the 'true' position since an uncertainty is associated with the position estimate e.g. that is output. Further, the random-like offset may for instance prevent e.g. statistically analyzing of multiple requests since the random-like offset may for instance be always have the same value for a respective single apparatus.

According to an exemplary embodiment of all exemplary aspects of the present invention, the offset is always the same for a certain single apparatus According to an exemplary embodiment of all exemplary aspects of the present invention, a respective offset is unique for a certain single apparatus.

Thus, the offset applied (e.g. added) to a position estimate indicative of or representing a position of the single apparatus may for instance be not pure random, since the 'true' position could then be subject to be discovered. This would be possible e.g. by repeating a request for determining of a position of the single (radio-enabled) apparatus multiple times, and then analyzing the results statistically. Instead, in order to not enable this possibility of determining the 'true' position of the single apparatus, the offset applied (e.g. added) to the 'true' position may for instance be always the same for the given, thus certain, single apparatus.

Further, the offset applied (e.g. added) to the 'true' position may for instance be unique for each respective single apparatus of one or more single apparatuses whose positions can be determined. Unique within the meaning of this specification is understood to be that each respective offset being applied (e.g. added) to a respective 'true' position of a respective single apparatus of one or more single apparatuses is different from all of the other offsets for other single apparatuses. Thus, no specific and same offset (representing a value) is applied (e.g. added) to two different single apparatuses.

Alternatively to the respective offset being unique for a certain single apparatus, two or more respective offsets for two or more single apparatuses may for instance be the same in case for a plurality of single apparatuses a plurality of such respective offsets is in use. For instance, in case a respective offset is the same for two single apparatuses, e.g. 10, 100, 1000 times or more of respective different respective offsets are in use for a plurality of single apparatuses. Thus, in case such a large ratio of different respective offsets that are in use for a plurality of single apparatuses to respective offsets that are the same and that are associated with at least two different single apparatuses, due to the likelihood for a third party to guess or find out what a certain offset for a specific single apparatus is, is relatively low. For instance, since a respective offset may for instance be represented by a hash value, there may for instance be a limited number (but very high absolute number) of different of such hash value in use.

According to an exemplary embodiment of all exemplary aspects of the present invention, the request is indicative of at least two single apparatuses, the method further comprises:
determining whether or not the at least two apparatuses of the request are known; and wherein the position estimate is determined based on the fingerprint information and the deviate information in case only one single apparatus of the at least two single apparatuses is known.

The at least two single apparatuses, as used herein, refer to a respective obtained request comprising e.g. identifiers of at least two single apparatuses. Since the position may for instance only be determinable for one known single apparatus of the at least two apparatuses of the request, it may for instance be required to deviate the position estimate to be determined, e.g. due to privacy issues of the user of the respective single apparatus, since even though the request comprises or represents of the request being based on at least two single apparatuses, only one of those single apparatuses may be utilized to determine the position estimate. This may for instance be the case since only one single apparatus of the at least two single apparatuses is known, e.g. to a positioning server/system.

Further, in case at least two single apparatuses of a respective request are known, the position estimate is determined based on e.g. at least two identifiers of those at least two single apparatuses. Thus, the position estimate is determined without considering or utilizing the deviate information, e.g. as known from the prior art. But in case only one single apparatus of the at least two single apparatuses is known, the position estimate is determined at least partially based on the deviate information. In this latter case, thus, the position estimate is deviated according to the method of the first exemplary aspect of the present invention.

According to an exemplary embodiment of all exemplary aspects of the present invention, the fingerprint information is indicative of at least one of an identifier of the single apparatus or of at least two identifiers of the at least two single apparatuses, of one location of the single apparatus or of at least two locations of the at least two single apparatuses, and of one received signal strength observation report of the single apparatus or of at least two received signal strength observation reports of the at least two single apparatuses, where a respective received signal strength value is gathered based on one or more radio signals sent by a respective single apparatus.

The position of the single apparatus may for instance be determined at least partially based on an identifier of the respective single apparatus(es) that are observable at a certain position. Such one or more identifiers of the respective single apparatus(es) may for instance represent an address of the respective single apparatus, e.g. a MAC address or a Bluetooth Device address, to name but a few non-limiting examples. Based on the respective identifier of the respective single apparatus(es), the respective location of the respective single apparatus(es) may for instance be retrievable, e.g. from a database in which the respective location(s) is/are stored and can be acquired based on the respective identifier of the respective single apparatus.

The fingerprint information may for instance be indicative of one or more received signal strength observation reports. Such received signal strength observation reports may for instance be collected in the form of radio fingerprint observation reports that are based on measurements by a respective radio-enabled electronic device, e.g. device mobile device. A radio fingerprint observation report may indicate an observation position and radio signal parameter(s) obtained as a result of measurements taken from the radio interface when scanning for observable radio signals at the observation position. Measurements taken from the radio interface of the respective electronic device may comprise, by way of example, measured received signal strengths and identifiers of radio nodes (e.g. Bluetooth beacons, WLAN access points, base stations of a cellular network) transmitting the radio signals observable at the observation position.

According to an exemplary embodiment of all exemplary aspects of the present invention, the deviate information is determined further based on an identifier of the single apparatus combined with a secret value.

Such an identifier may for instance be an address of the single apparatus. The address may for instance be a MAC address in case the single apparatus is a WLAN- and/or cellular-enabled electronic device. Such a MAC address is a unique identifier assigned to the single apparatus configured as a WLAN- and/or cellular-enabled electronic device.

In case the single apparatus is a BT- and/or BLE-enabled device, the identifier may for instance be an address of this BT- and/or BLE-enabled device. Such an address may for instance be a Bluetooth device address. Such a Bluetooth device address is a unique identifier assigned to the single apparatus configured as a BT- and/or BLE-enabled device.

The secret value may for instance be indicative of or represent an integer, a hexadecimal, or a string value, to name but a few non-limiting examples.

The secret value and/or the offset for a respective single apparatus may for instance be stored, e.g. in a memory. The memory may for instance comprise a database. In the database, e.g. the secret value and/or the offset for a respective single apparatus may for instance be stored, e.g. by associating (e.g. linking) an identifier of the respective single apparatus with the secret value and/or the offset for the respective single apparatus. The memory may for instance be comprised by or connectable to the apparatus performing and/or controlling the method according to the first exemplary aspect of the present invention.

According to an exemplary embodiment of all exemplary aspects of the present invention, the deviate information is determined further based on a hash function that is determined based on the combination of the identifier of the single apparatus and the secret value.

The hash function may for instance enable to use any amount of input data and output data of a fixed size. Such a hash function further enables to protect the combination of e.g. the address of the single apparatus and the secret value. Further, the combination of the address of the single apparatus and the secret value may for instance be used as an input to the hash function. The output of the hash function may for instance still be uniquely identifiable. Thus, no other combination of a respective address of another single apparatus and a respective secret value may for instance have the same output by the hash function. Thus, the hash function may for instance be collision-resistant.

According to an exemplary embodiment of all exemplary aspects of the present invention, the hash function is a one-way hash function.

The one-way hash function may for instance be indicative of a hash function, wherein it is impossible to acquire the input of the hash function based on the known output.

To name but a few non-limiting example, the hash function or the one-way hash function may for instance be MD4 (Message-Digest Algorithm), MD5, SHA (Secure Hash Algorithm), or SHA-256.

According to an exemplary embodiment of all exemplary aspects of the present invention, the offset is comprised by or associated with a radio map, or a part of it.

The radio map, or a part of it (so-called partial radio map), may for instance be stored, e.g. in a memory. The memory may for instance comprise a database. The database may for instance be accessible, e.g. as a service. The memory may for instance be comprised by or connectable to a server or a server cloud, e.g. a positioning server to name but one non-limiting example.

The offset may for instance be associated with a respective radio node representing a respective single apparatus. The offset may for instance be comprised by or represented by the radio map, or a part of it.

For instance, when a radio map is generated, e.g. at least partially based on crowd-sourced pieces of fingerprint information, one or more respective offsets for one or more radio nodes comprised by or represented by the radio map may for instance be incorporated into the radio map. Thus, e.g. when generating the radio map, the offset may for instance be randomized once at the time when e.g. the WLAN coverage model is stored in the database comprising or representing the radio map.

According to an exemplary embodiment of all exemplary aspects of the present invention, the offset is obtained from the radio map, or a part of it, prior to the determining of the deviate information.

In this way, the offset may for instance be obtained from the radio map, or a part of it.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding of the present invention and shall be understood to complement and be read together with the description as provided in the above summary section of this specification.

Figure 1:
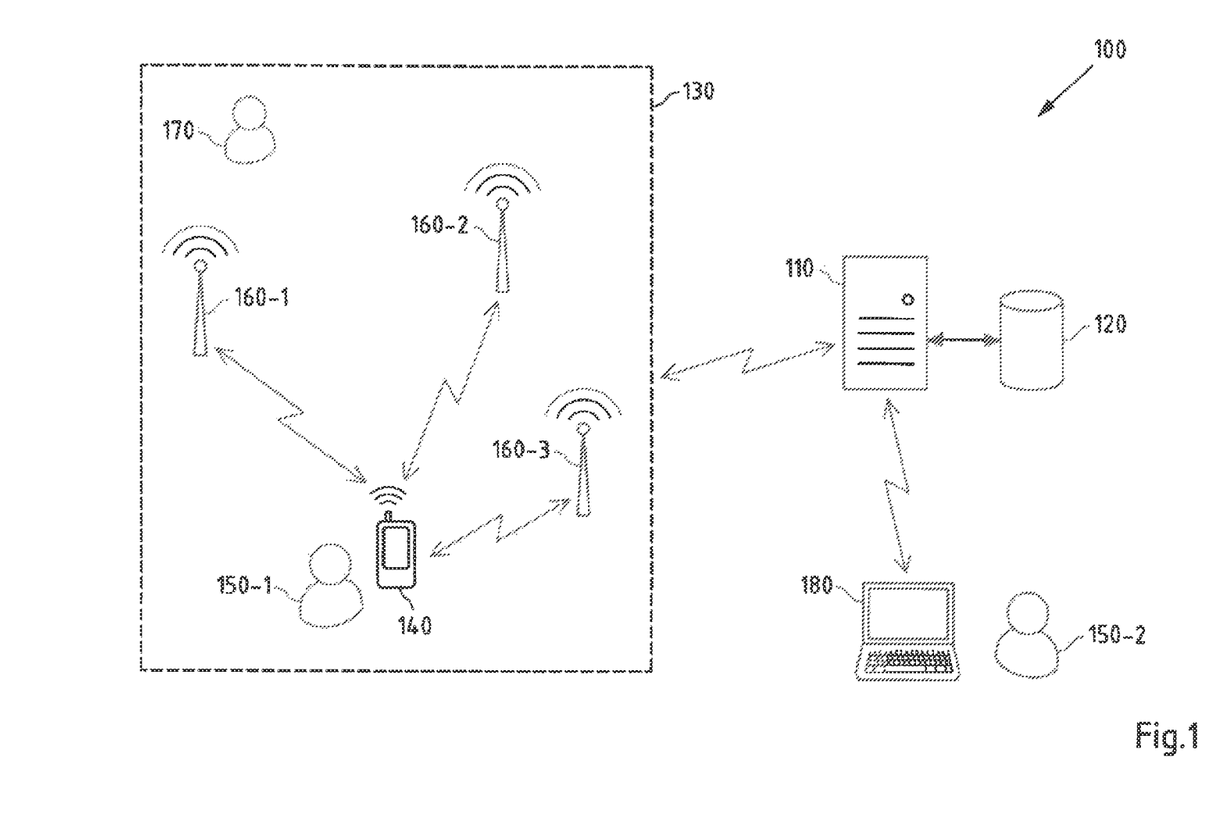
FIG. 1 a schematic block diagram of a system according to an exemplary aspect of the present invention.

FIG. 1 is a schematic high-level block diagram of a system 100 according to an exemplary aspect of the present invention. Such a system may for instance represent a non-GNSS-based positioning and support system.

System 100 comprises a server 110, an optional database 120, one or more electronic devices 140 (from which one is exemplary shown in FIG. 1), a user respectively holder 150-1 of the shown electronic device 140, another user respectively holder 170 of the radio node 160-1, and another user respectively holder 150-2 of the personal computer 180. User respectively holder 150-2 may for instance be the same user respectively holder 150-1 of the electronic device 140. Personal computer 180 may for instance be located at the home of user respectively holder 150-2. In case users respectively holders 150-1, 150-2 are the same, personal computer 180 may for instance be located at the home of this user respectively holder.

The electronic device 140 may for instance be configured as a smartphone, tablet, portable navigation device, IoT (Internet-of-Things) device, wearable, or the like to name but a few non-limiting examples. The electronic device 140 may for instance be a stationary device. The radio node 160-1 is a radio-enabled single apparatus within the meaning of the present invention. The radio node 160-1 may for instance be configured as a WLAN access point and/or a BTand/or BLE-beacon. Further, the other radio nodes 160-2, 160-3 may for instance be configured as WLAN access points and/or a BT- and/or BLE-beacons as well. The other radio nodes 160-2, 160-3 may for instance also be considered as respective single apparatuses within the meaning of the present invention.

The server 110 may alternatively be embodied as a server cloud (e.g. a plurality of servers connected, e.g. via the Internet, and providing services at least partially jointly). The server 110 may be embodied as a positioning server, e.g. enabling the provision of a partial radio map, and/or a radio map. Based on such a partial radio map and/or radio map, e.g. positioning services such as indoor positioning and/or floor detection services may for instance be enabled. The server 110 may for instance be connected to the radio nodes 160-1 to 160-3, and/or to the personal computer 180, and/or to electronic device 140 via a communication network, e.g. the Internet, and/or a cellular communication network (not shown in FIG. 1), to name but a few non-limiting examples.

The database 120 may for instance be optional. The database 120 may for instance be comprised by or be connectable to the server 110. The database 120 may for instance comprise or represent a memory, e.g. for storing a radio map, one or more requests for determining position estimates of single apparatuses, one or more pieces of fingerprint information, one or more pieces of deviate information, and/or one or more position estimates, to name but a few non-limiting examples.

Example embodiments according to all aspects of the present invention enable to determine a position estimate of the radio node 160-1 even if the position estimate is determined at least partially based on a request e.g. from user 150-2 which requests only the position of the radio node 160-1 to be determined. Optionally, such a request may for instance be accompanied by a gathered fingerprint information. The fingerprint information may for instance be gathered by electronic device 140 of user respectively holder 150-1, which is in this case considered to be the same as user respectively holder 150-2, as described above. The gathered fingerprint information may for instance be indicative of one or more signals sent by the radio nodes 160-1 to 160-3. In particular, the gathered fingerprint information comprises one or more signals sent by radio node 160-1 of its user respectively holder 170, e.g. in the form of an identifier of this radio node 160-1 (e.g. a MAC address). Then, this gathered fingerprint information may for instance be utilized to send the request via the personal computer 180. It will be understood that the request may for instance also be sent by user respectively holder 150-1 via the electronic device 140. The determined position estimate may for instance be indicative of the certain position of the radio node 160 which is indicative of an uncertainty radius. Since the position of the radio node 160-1 can be very closely related to the position of its user respectively holder 170, in order to protect the privacy of user respectively holder170, the determined position estimate comprises or represents deviated coordinates which deliberately differ from the 'true' coordinates (representing the 'true', thus certain, position) of the radio node 160-1. Therefore, the determined position estimate is associated with an uncertainty (e.g. a radius of a certain length is represented by the position estimate). The uncertainty radius of the position estimate may for instance indicate that the position comprised by or represented by the position estimate is not exact. For instance, the position estimate may not represent the position of a respective building comprising radio node 160-1, but of the whole area 130. This area 130 may for instance comprise a plurality of buildings in the neighborhood of the building comprising radio node 160-1. For instance, a first building of user respectively holder 170 comprises radio node 160-1, a second building comprises radio node 160-2, and a third building comprises radio node 160-3. All of these three buildings are located within the area 130. In this way, user 180 cannot acquire the 'true' position of the radio node 160-1 respectively its user respectively holder 170.

Thus, the limitation of e.g. requiring at least two co-located single apparatuses (e.g. radio node 160-1 and one or more further radio nodes (e.g. 160-2 and 160-3) in respective neighbor buildings) to be required for a position of the radio node 160-1 to be determined is solved. In this way, the availability of the positioning is increased since the determining of a position estimate for a single apparatus (e.g. radio node 160-1) is enabled by example embodiments according to all exemplary aspects of the present invention.

Figure 2:
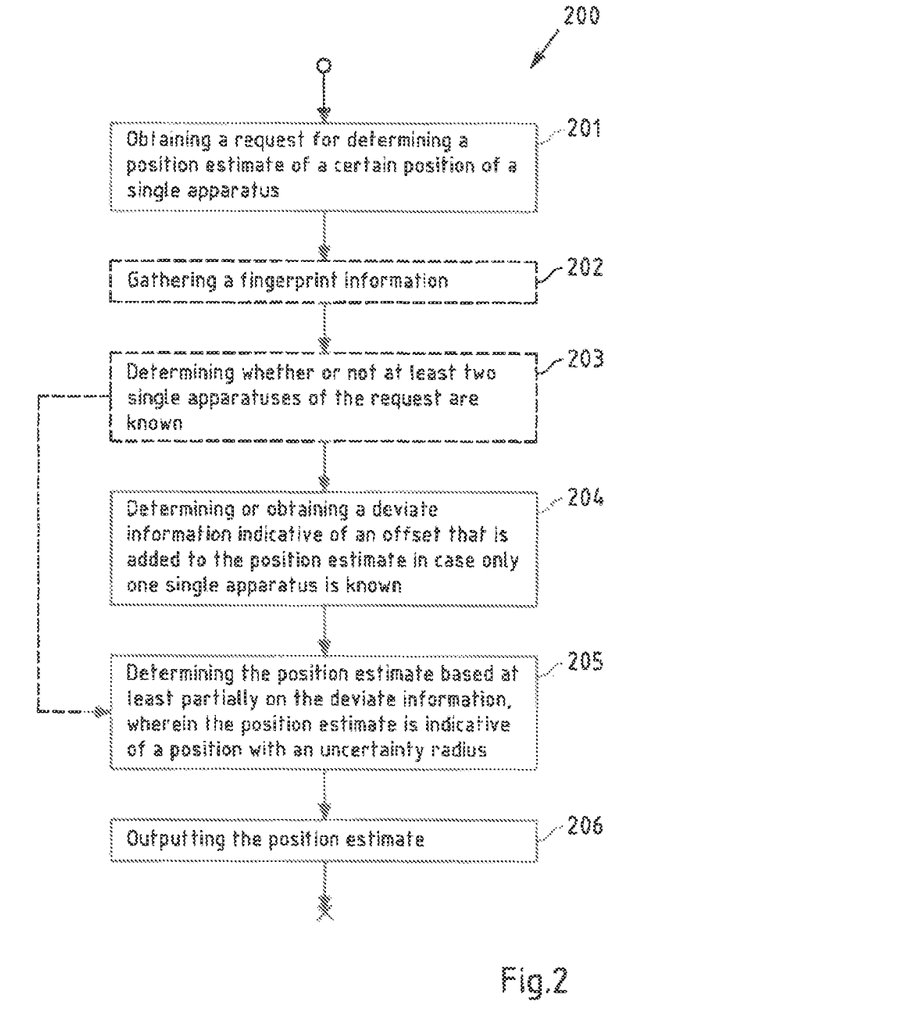
FIG. 2 a flowchart showing an example embodiment of a method according to the first exemplary aspect of the present invention.

FIG. 2 is a flowchart 200 showing an example embodiment of a method according to the first exemplary aspect of the present invention. This flowchart 200 may for instance be performed by a server, e.g. server 110 of FIG. 1. This flowchart may for instance be performed and/or controlled by apparatus 300 of FIG. 3.

In a first step 201, a request for determining a position estimate of a certain position of a single apparatus (e.g. radio node 160-1 of FIG. 1) is obtained. The request may for instance be obtained by receiving the request (e.g. via communication interface(s) 350 of apparatus 300 of FIG. 3).

In case the flowchart 200 is performed and/or controlled by server 110 of FIG. 1, the request may for instance be obtained e.g. by receiving the request from a third party. For instance, the request may for instance be received by the server 110 of FIG. 1 from the computer 180 of FIG. 1.

In an optional second step 202, the fingerprint information is gathered. The fingerprint information may for instance be gathered by an electronic device, e.g. electronic device 140 of FIG. 1) The fingerprint information may for instance be gathered by the electronic device 140 by measuring one or more signals of one or more radio nodes (e.g. radio nodes 160-1 to 160-3 of FIG. 1).

In optional step 203, it is determined whether or not at least two single apparatuses of the request (see step 201) are known, e.g. to the positioning system respectively server. In case at least two single apparatuses are known, there is no need to deviate the position estimate to be determined. Otherwise, in case only one single apparatus of the request (see step 201) is known, it is continued with step 204.

In a fourth step 204, the deviate information is determined or obtained, e.g. in case only one single apparatus is determined to be known in optional step 203. In case the offset that is applied (e.g. added) to the position estimate is comprised by a radio map, e.g. stored in a database (e.g. database 120 of FIG. 1), the deviate information can be obtained from this database. Alternatively, e.g. a radio map comprising such one or more offsets is not available, the deviate information may for instance be determined (e.g. generated), e.g. by a processor (e.g. processor 310 of FIG. 3).

In a fifth step 205, the position estimate is determined. The position estimate may for instance be determined (e.g. estimated), e.g. by a processor (e.g. processor 310 of FIG. 3).

In an optional sixth step 206, the position estimate of step 205 is output, e.g. to the respective device from which the respective request is received in step 201, e.g. to personal computer 180 of FIG. 1. The position estimate may for instance be output via a communication network, e.g. the Internet (not shown in FIG. 1). Alternatively, the position estimate is output to an entity that is different from the respective device, wherein the position estimate is then relayed to the respective device by the entity that is different from the respective device.

Figure 3:
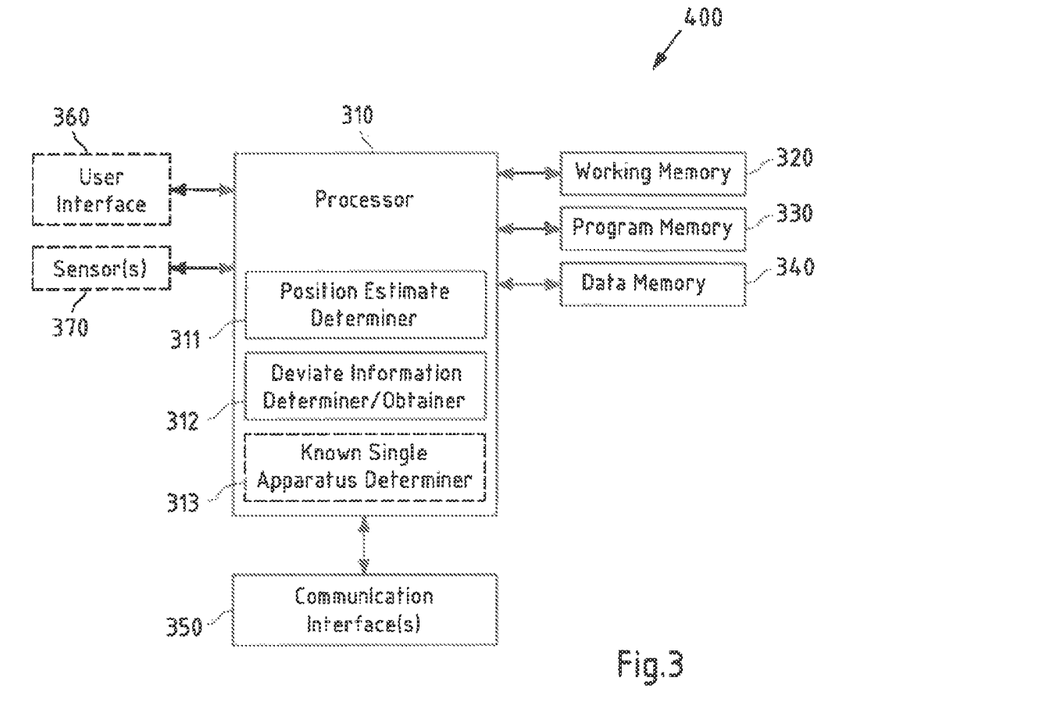
FIG. 3 a schematic block diagram of an apparatus configured to perform the method according to the first exemplary aspect of the present invention.

It will be understood that at least some of the steps 201 to 206 may for instance be performed and/or controlled by different entities, e.g. a server cloud. For instance, steps 201 and 203 may for instance be performed and/or controlled by a server (e.g. a positioning server, e.g. server 110 of FIG. 1). Then, steps 203 to 206 may for instance be performed and/or controlled by another server. It will be understood that in case the steps 201 to 206 are performed and/or controlled by different entities, it may for instance be required to transmit necessary information between those entities, e.g. via corresponding communication interface(s), such as communication interface(s) 350 of apparatus 300 that may for instance represent at least one of those entities.

FIG. 3 is a schematic block diagram of an apparatus 300 according to an exemplary aspect of the present invention, which may for instance represent server 110 of FIG. 1.

Apparatus 300 comprises a processor 310, working memory 320, program memory 330, data memory 340, communication interface(s) 350, an optional user interface 360 and an optional sensor(s) 370.

Apparatus 300 may for instance be configured to perform and/or control or comprise respective means (at least one of 310 to 370) for performing and/or controlling the method according to the first exemplary aspect of the present invention. Apparatus 300 may as well constitute an apparatus comprising at least one processor (310) and at least one memory (320) including computer program code, the at least one memory and the computer program code configured to, with the at least one processor, cause an apparatus, e.g. apparatus 300 at least to perform and/or control the method according to the first exemplary aspect of the invention of the present invention.

Processor 310 may for instance comprise a position estimate determiner 311 as a functional and/or structural unit. Position estimate determiner 311 may for instance be configured to determine a position estimate (see step 205 of FIG. 2).

Processor 310 may for instance comprise a deviate information determiner/obtainer 312 as a functional and/or structural unit. Deviate information determiner/obtainer 312 may for instance be configured to obtain or determine a deviate information (see step 204 of FIG. 2).

Processor 310 may for instance comprise an optional known single apparatus determiner 313 as a functional and/or structural unit. Known single apparatus determiner 313 may for instance be configured to determine whether or not a single apparatus respectively its identifier comprised by or represented by a request (e.g. obtained in step 201 of FIG. 2) is known (see step 203 of FIG. 2), e.g. to a system (e.g. system 100 of FIG. 1).

Processor 310 may for instance further control the memories 320 to 340, the communication interface(s) 350, the optional user interface 360 and the optional sensor(s) 370.

Communication interface(s) 350 may for instance be configured to obtain a request for determining a position estimate of a certain position of a single apparatus (see step 201 of FIG. 2).

Processor 310 may for instance execute computer program code stored in program memory 330, which may for instance represent a computer readable storage medium comprising program code that, when executed by processor 310, causes the processor 310 to perform the method according to the first exemplary aspect of the present invention.

Processor 310 (and also any other processor mentioned in this specification) may be a processor of any suitable type. Processor 310 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 310 may for instance be an application processor that runs an operating system.

Program memory 330 may also be included into processor 310. This memory may for instance be fixedly connected to processor 310, or be at least partially removable from processor 310, for instance in the form of a memory card or stick. Program memory 330 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 330 may also comprise an operating system for processor 310. Program memory 330 may also comprise a firmware for apparatus 300.

Apparatus 300 comprises a working memory 320, for instance in the form of a volatile memory. It may for instance be a Random Access Memory (RAM) or Dynamic RAM (DRAM), to give but a few non-limiting examples. It may for instance be used by processor 310 when executing an operating system and/or computer program.

Data memory 340 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 340 may for instance store a radio map, one or more requests for determining position estimates of single apparatuses, one or more pieces of fingerprint information, one or more pieces of deviate information, and/or one or more position estimates.

Communication interface(s) 350 enable apparatus 300 to communicate with other entities, e.g. with computer 180, and/or electronic device 140 of FIG. 1 in case apparatus 300 represents server 110 of FIG. 1 or at least one of the radio nodes 160-1 to 160-3 of FIG. 1.

The communication interface(s) 350 may for instance comprise a wireless interface, e.g. a cellular radio communication interface, a WLAN interface, and/or a BT/BLE interface) and/or wire-bound interface, e.g. an IP-based interface, for instance to communicate with entities via the Internet.

User interface 360 is optional and may comprise a display for displaying information to a user and/or an input device (e.g. a keyboard, keypad, touchpad, mouse, etc.) for receiving information from a user.

Sensor(s) 370 are optional.

Some or all of the components of the apparatus 300 may for instance be connected via a bus. Some or all of the components of the apparatus 300 may for instance be combined into one or more modules.

The following embodiments shall also be considered to be disclosed:

If a position estimate is based on a single WLAN access point, deviate the returned coordinates deliberately from the learned "true" coordinates, that is, add apparently random offset to the coordinates (and increase the uncertainty radius of the position estimate accordingly, in order to indicate that the position is not exact).

The offset may not be pure random, because then the true location could be found out by repeating the request for the same WLAN multiple times, and analyzing the results statistically. Instead, the offset may be always the same for a given access point. And the offset must be different from every other access point so that it's not possible to know the offset for a given access point even if the offsets of some other access points are known.

Earlier solutions: Requiring at least two co-located WLANs (to be found from the database of known WLANs) reduces the availability of the positioning. If the location is known only for a single WLAN, the service cannot return a position estimate at all.

For instance, a mobile device (e.g. a smartphone) observes near-by WLAN access points. If the smartphone observes only a single WLAN access point—thus only radio signals of this single WLAN access point are observable at the current location of the smartphone, or only one of the observed WLAN access points is known to the utilized positioning system—the positioning system may not be allowed to report an accurate position estimate e.g. of a respective WLAN access point that were observed by the smartphone, because of privacy restrictions.

Example embodiments of all aspects of the present invention enable to determine a position estimate for the aforementioned case as well, while respecting privacy restrictions. According to an example embodiment of all exemplary aspects of the present invention, a position estimate is determined even if only a single WLAN access point respectively (e.g. radio) signals sent by this single WLAN access point are observable at a current location of a respective electronic device (e.g. mobile device). For instance, such a position estimate can be determined, e.g. if both of the following aspects are fulfilled:
  (i) reported position estimate is deviated to make it less accurate (but still meaningfully accurate for a lot of use cases); and
  (ii) it is not possible to discover the accurate position estimate repeatedly issuing the same positioning request (in other words, the position estimate is always deviated in the same manner when based on the given WLAN access point in question).

Further, e.g. if two or more WLAN access points are observable by the respective electronic device (e.g. a smartphone) that may for instance send a respective request comprising these two or more WLAN access points, wherein this request is obtained by an apparatus performing and/or controlling the method according to the first exemplary aspect of the present invention, and further, the two or more WLAN access points are known to a positioning system, then the corresponding position estimate does not need to be deviated. Then, the position estimate can be determined according to known solutions.

Advantages: Improved positioning availability, position estimate can be returned even if only a single WLAN access point is known. Even a less accurate position estimate is typically preferred over no position estimate at all; many positioning use cases do not require precise positioning, but even a rough position estimate is good enough.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

That which is claimed is:

1. A method, comprising:
  obtaining a request for determining a position estimate of an electronic device, wherein fingerprint information indicative of one or more signals sent by at least one apparatus and observed by the electronic device is received with the request; and when it is determined that the at least one apparatus that sent the one or more signals consists of a single apparatus:
obtaining or determining a deviate information indicative of an offset that is to be added to the position estimate to be determined; and
determining the position estimate based at least partially on the deviate information and the fingerprint information, wherein the position estimate is indicative of a position with an uncertainty radius.

2. The method according to claim 1, wherein the single apparatus is a radio node.

3. The method according to claim 1, wherein, when it is determined that the at least one apparatus that send the one or more signals consists of the single apparatus, determining the position estimate comprises:
determining a more accurate position estimate based at least in part on the fingerprint information; and
determining a less accurate position estimate at least in part by adding the offset to the more accurate position, wherein the less accurate position estimate is returned as the position estimate; and
wherein the method further comprises when it is determined that the at least one apparatus that sent the one or more signals comprises two or more apparatuses, determining the position estimate based at least in part on the fingerprint information.

4. The method according to claim 1, wherein the offset of the deviate information is a random-like offset that is applied to the position when the position estimate is determined.

5. The method according to claim 1, wherein the offset is always the same for a certain single apparatus.

6. The method according to claim 1, wherein the uncertainty radius indicates an uncertainty in the position estimate.

7. The method according to claim 1, wherein the fingerprint information received with the request is indicative of at least two single apparatuses; the method further comprising:
determining whether or not the at least two apparatuses of the request are known; and
wherein the position estimate is determined based on the fingerprint information and the deviate information in case only one single apparatus of the at least two single apparatuses is known.

8. The method according to claim 7, wherein the fingerprint information is indicative of at least one of an identifier of the single apparatus or of at least two identifiers of the at least two single apparatuses, of one location of the single apparatus or of at least two locations of the at least two single apparatuses, and of one received signal strength observation report of the single apparatus or of at least two received signal strength observation reports of the at least two single apparatuses, where a respective received signal strength value is gathered based on one or more radio signals sent by a respective single apparatus.

9. The method according to claim 1, wherein a respective offset is unique for the single apparatus.

10. The method according to claim 1, wherein the deviate information is determined further based on an identifier of the single apparatus combined with a secret value.

11. The method according to claim 10, wherein the deviate information is determined further based on a hash function that is determined based on the combination of the identifier of the single apparatus and the secret value.

12. The method according to claim 1, wherein the offset is comprised by or associated with a radio map, or a part of the radio map.

13. The method according to claim 12, wherein the offset is obtained from the radio map, or a part of the radio map, prior to the determining of the deviate information.

14. An apparatus comprising a processor and a memory including computer program code, the computer program code configured to, when executed by the processor, cause the apparatus to:
obtain a request for determining a position estimate of an electronic device, wherein fingerprint information indicative of one or more signals sent by at least one apparatus and observed by the electronic device is received with the request; and
when it is determined that the at least one apparatus that sent the one or more signals consists of a single apparatus:
obtain or determine a deviate information indicative of an offset that is added to the position estimate to be determined; and
determine the position estimate based at least partially on the deviate information and the fingerprint information, wherein the position estimate is indicative of a position with an uncertainty radius.

15. The apparatus according to claim 14, wherein the request comprises or is accompanied by a fingerprint information indicative of one or more signals sent by the single apparatus, wherein the position estimate is determined further based on the fingerprint information.

16. The apparatus according to claim 14, wherein the offset of the deviate information is a random-like offset that is applied to the position when the position is determined.

17. The apparatus according to claim 14, wherein the request is indicative of at least two single apparatuses, and wherein the computer program code is configured to, when executed by the processor, further cause the apparatus to:
determine whether or not the at least two apparatuses of the request are known; and
wherein the position estimate is determined based on the fingerprint information and the deviate information in case only one single apparatus of the at least two single apparatuses is known.

18. The apparatus according to claim 17, wherein the fingerprint information is indicative of at least one of an identifier of the single apparatus or of at least two identifiers of the at least two single apparatuses, of one location of the single apparatus or of at least two locations of the at least two single apparatuses, and of one received signal strength observation report of the single apparatus or of at least two received signal strength observation reports of the at least two single apparatuses, where a respective received signal strength value is gathered based on one or more radio signals sent by a respective single apparatus.

19. The apparatus according to claim 14, wherein a respective offset is unique for the single apparatus.

20. A non-transitory computer readable storage medium storing computer program code configured, upon execution, to:
obtain a request for determining a position estimate of an electronic device, wherein fingerprint information indicative of one or more signals sent by at least one apparatus and observed by the electronic device is received with the request; and
when it is determined that the at least one apparatus that sent the one or more signals consists of a single apparatus:
obtain or determine a deviate information indicative of an offset that is added to the position estimate to be determined; and determine the position estimate based at least partially on the deviate information and the fingerprint information, wherein the position estimate is indicative of a position with an uncertainty radius.

* * * * *

UNITED STATES PATENT AND TRADEMARK OFFICE
CERTIFICATE OF CORRECTION

| | |
|---|---|
| PATENT NO. | : 11,415,659 B2 |
| APPLICATION NO. | : 16/706090 |
| DATED | : August 16, 2022 |
| INVENTOR(S) | : Petri Rauhala et al. |

It is certified that error appears in the above-identified patent and that said Letters Patent is hereby corrected as shown below:

In the Claims

In Column 20, Line 4, Claim 14, delete "processer" and insert -- processor --, therefor.

In Column 20, Line 6, Claim 14, delete "processer," and insert -- processor, --, therefor.

In Column 20, Line 34, Claim 17, delete "processer," and insert -- processor, --, therefor.

Signed and Sealed this
Twelfth Day of September, 2023

Katherine Kelly Vidal
*Director of the United States Patent and Trademark Office*